(12) United States Patent
Carrig et al.

(10) Patent No.: US 6,658,036 B1
(45) Date of Patent: Dec. 2, 2003

(54) LASERS AND AMPLIFIERS BASED ON HYBRID SLAB ACTIVE MIRRORS

(75) Inventors: Timothy J. Carrig, Lafayette, CO (US); Allen K. Hankla, Lafayette, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/185,743

(22) Filed: Jun. 27, 2002

(51) Int. Cl.[7] .................................................. H01S 3/06
(52) U.S. Cl. .............................. 372/66; 372/25; 372/99
(58) Field of Search .............................. 372/66, 35, 99; 359/337, 345

(56) References Cited

U.S. PATENT DOCUMENTS

| | | | | |
|---|---|---|---|---|
| 5,646,773 A | * | 7/1997 | Injeyan et al. | ............... 359/337 |
| 6,134,258 A | * | 10/2000 | Tulloch et al. | ................. 372/99 |
| 6,256,142 B1 | * | 7/2001 | Injeyan et al. | ............... 359/345 |
| 6,268,956 B1 | * | 7/2001 | Injeyan et al. | ............... 359/345 |
| 6,339,605 B1 | * | 1/2002 | Vetrovec | ..................... 372/35 |

* cited by examiner

Primary Examiner—Paul Ip
Assistant Examiner—Tuan Nguyen
(74) Attorney, Agent, or Firm—William G. Auton

(57) ABSTRACT

A hybrid slab laser is made using a slab of active laser material, for instance Yb:YAG, capped by a nonactive material, for instance undoped YAG or sapphire. The two materials are bonded together, for instance by diffusion bonding. The composite slab is then cut and polished to serve as a laser gain module. The slab can be Brewster-cut or flat-flat and antireflection coated on the ends. Alternatively, the nonactive material can be sandwiched between two active regions. The slab is pumped from the top face like a disk laser or from the end like a longitudinally pumped slab. The slab could also be side-pumped using close coupled diodes. The preferred pumping mechanism depends on the pump source used. The slab generates or amplifies a laser beam that is longitudinally coupled into the device through the end (possibly Brewster-cut) surfaces. The laser beam bounces via total internal reflection within the slab passing one or more times through the active part(s) of the medium. The active region can vary in thickness. The thickness is chosen to minimize thermal and/or stress gradients in the material.

1 Claim, 3 Drawing Sheets

LASERS AND AMPLIFIERS BASED ON HYBRID SLAB ACTIVE MIRRORS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to slab laser materials and more specifically to a laser design that uses two similar materials, one laser active and one not active, that are bonded together to form a composite slab of material. Appropriate antireflection coatings (to pump through) or TIR preserving and bonding coatings (to heatsink to) are placed on the TIR surfaces of the slab.

Slab laser materials and disk lasers share some aspects of the invention. These laser geometries have been described by multiple groups, and examples are described in the following U.S. Patents, the disclosures of which are incorporated herein by reference:

U.S. Pat. No. 4,725,787
U.S. Pat. No. 6,134,258
U.S. Pat. No. 6,094,297
U.S. Pat. No. 5,651,021

The best reference is the Phase-conjugated hybrid slab laser of U.S. Pat. No. 4,725,787. It shows a relatively low-power but high-quality laser oscillator couple to a high-power laser amplifier. The amplifier includes a rectangular slab of laser active material, and a phase-conjugate end mirror.

SUMMARY OF THE INVENTION

The present invention is a laser design that provides a method to efficiently pump laser materials so that pump energy is confined to the amplifying mode volume. Especially useful in quasi-three level materials because the design reduces the effect of reabsorption in weakly pumped regions of the gain media. Provides a higher damage threshold than that achieved in thin disk laser media.

As mentioned above, slab laser materials and disk lasers share some aspects of the invention. These laser geometries have been described by multiple groups.

One embodiment uses a slab of active laser material, for instance Yb:YAG, capped by a nonactive material, for instance undoped YAG or sapphire. The two materials are bonded together, for instance by diffusion bonding. The composite slab is then cut and polished to serve as a laser gain module. The slab can be Brewster-cut or flat-flat and antireflection coated on the ends. Alternatively, the nonactive material can be sandwiched between two active regions.

The slab is pumped from the top face like a disk laser or from the end like a longitudinally pumped slab. The slab could also be side-pumped using close coupled diodes. The preferred pumping mechanism depends on the pump source used. The slab generates or amplifies a laser beam that is longitudinally coupled into the device through the end (possibly Brewster-cut) surfaces. The laser beam bounces via total internal reflection within the slab passing one or more times through the active part(s) of the medium. The active region can vary in thickness. The thickness is chosen to minimize thermal and/or stress gradients in the material. One of both of the large flat TIR surfaces of the slab is placed against a heatsink. A multilayer coating consisting of (1) a TIR preserving coating and a metallic coating is placed on each of the TIR-surfaces. In some embodiments a highly reflecting dielectric coating is also placed between the TIR preserving and metallic coating. The other TIR surface can be antireflection coated, for instance to pump through, or have the TIR preserving and metallic coatings to serve as a cooling surface.

All embodiment of the invention use two similar materials, one laser active and one not active, that are bonded together to form a composite slab of material. Appropriate antireflection coatings (to pump through) or TIR preserving and bonding coatings (to heatsink to) are placed on the TIR surfaces of the slab.

DESCRIPTION OF THE PREFERRED EMBODIMENT

The present invention is a design for lasers and amplifiers based on hybrid slab active mirrors. In this design two similar materials, one laser active and one not active, that are bonded together to form a composite slab of material. Appropriate antireflection coatings (to pump through) or TIR preserving and bonding coatings (to heatsink to) are placed on the RIT surfaces of the slab.

Figure 1:
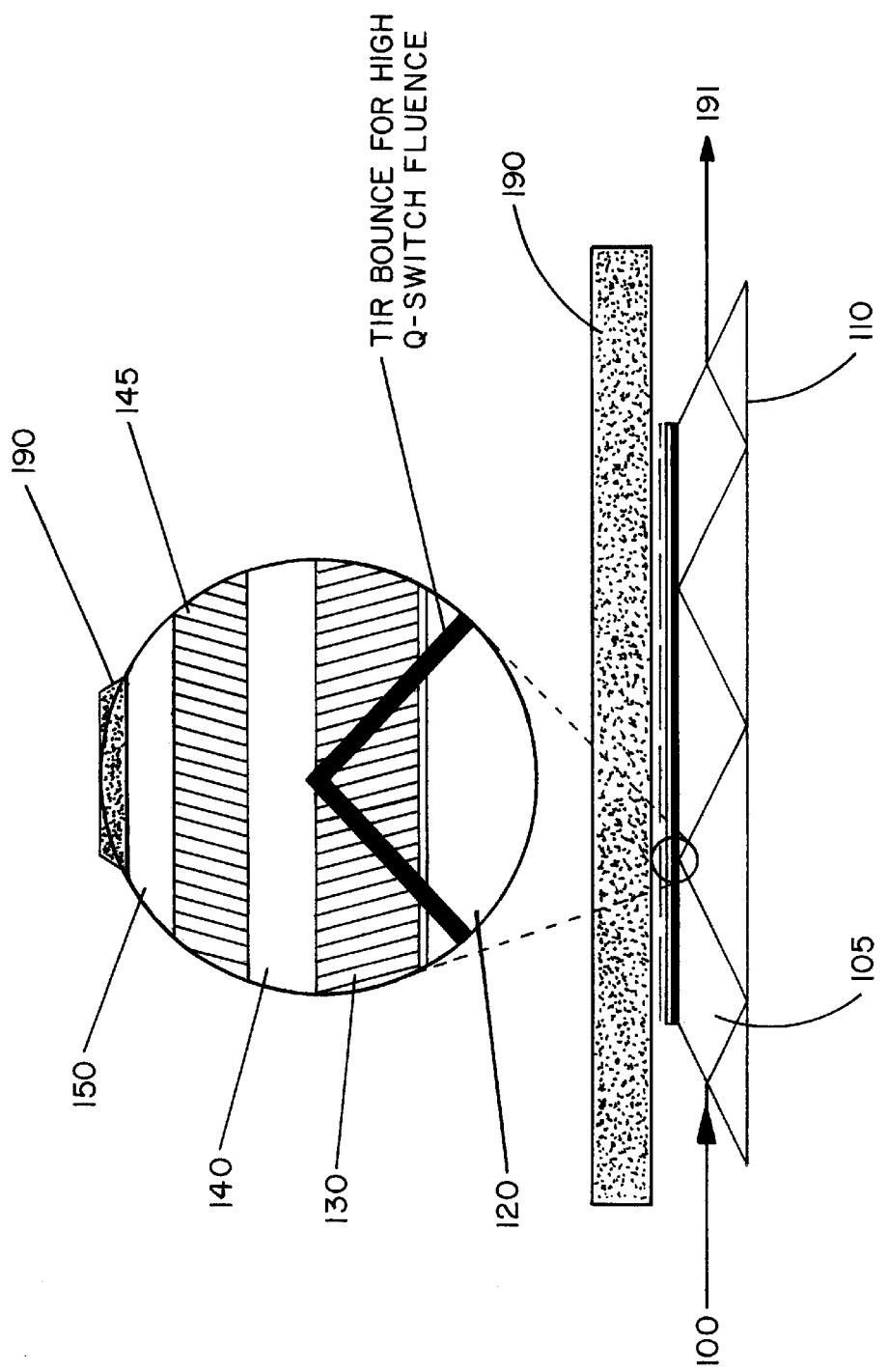
FIG. 1 is a schematic of the hybrid slab laser layers considered in the FEM thermal analysis with an end pump laser.

The reader's attention is now directed towards FIG. 1, which is an end pumped hybrid slab laser that has a pump beam source 100 stimulating the active area of a laser 105 bounded by a mirror 110 to produce an output laser beam. While the mirror 110 induces some losses, the internal light can be amplified by the Yb:YAG 130 so it is reflected without losses. The inactive laser is embodied in layers 120–150, which do not induce losing but are used to amplify internally reflected signals.

Figure 3:
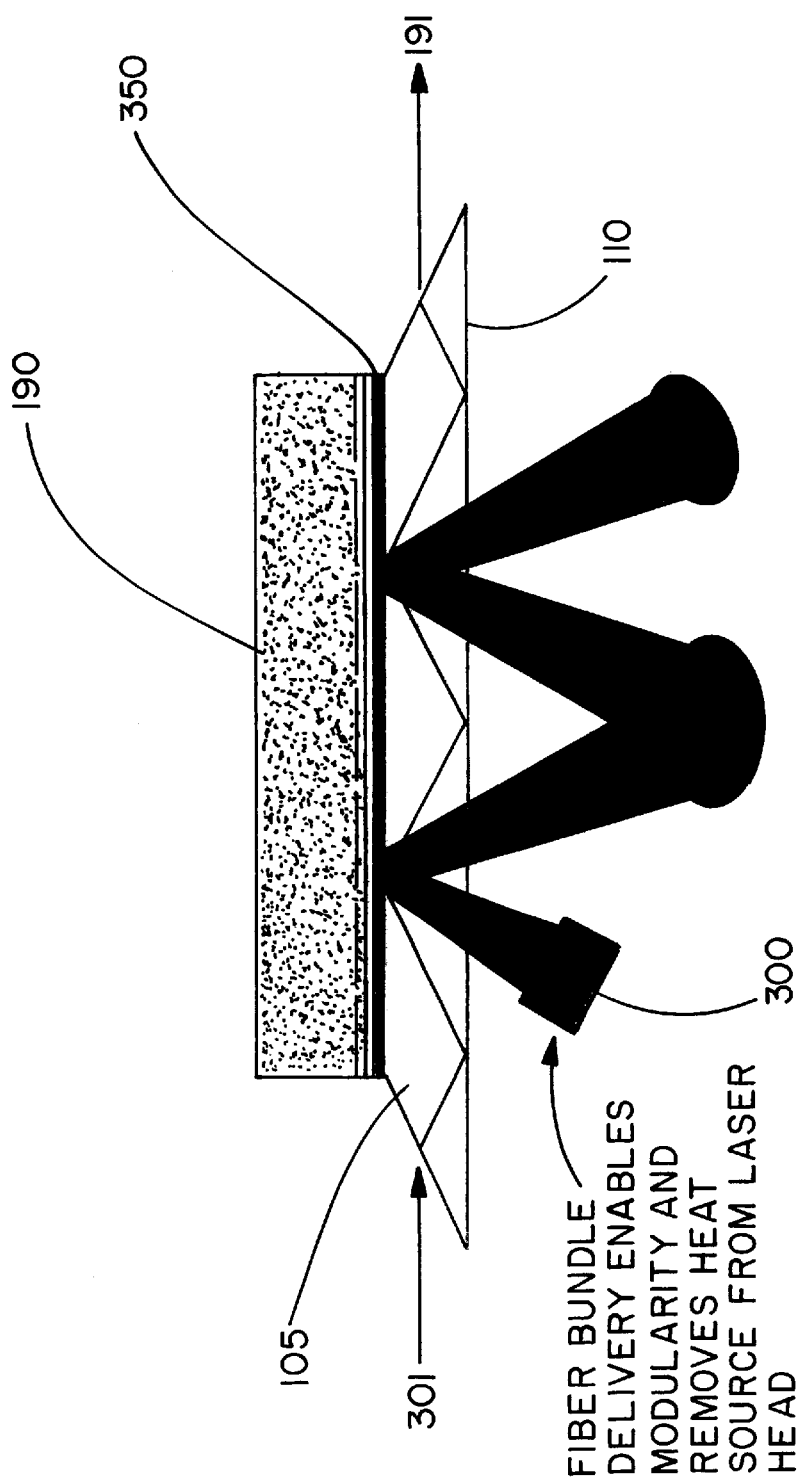
FIG. 3 is a view of the top pumped hybrid slab laser of the present invention.

FIGS. 1 and 3 show a hybrid slab laser system for use with a pump laser that emits a laser pumping beam that provides pump energy to the hybrid slab laser. In FIG. 1, the hybrid slab laser system includes:

an active laser substrate 105 which has a top side and a bottom side and which contains material layers which are stimulated the laser pumping beam to emit a laser output beam;

a mirror 110 fixed to the bottom side of the active layer substrate;

an undoped YAG layer 120 that is face bonded to the top side of the active layer substrate and through which laser signals from the active layer substrate passes;

a Yb doped YAG layer 130 that is fixed above the undoped YAG layer and which amplifies laser signals from the active layer back into the amplifying mode volume of the active layer substrate with no losses;

an metallic reflecting coating 150 which is fixed above the Yb doped YAG layer to reflect laser signals back through the Yb doped YAG layer into the active layer substrate; and a heat sink 190 which is fixed above the metallic reflecting coating to reduce thermal effects of the laser signals. Also shown in FIG. 1 is the HR. Dielectric coating 145, and a TIR preserving coating 140, but these are not essential to practice the inventions.

If the slab is end-pumped it resembles a rod laser. The slab can be illuminated from the top or bottom to perform as a disk laser as described below.

FIG. 1 shows a schematic of the hybrid slab gain medium. A Finite Element Model (FEM) was developed for this laser using the commercial code COSMOS/M. Because we wished to optimize our overall laser efficiency we assumed that only the "TIR points" in the Yb:YAG region were pumped rather than the entire slab or active region of the slab. Consequently, each pumped TIR point acts like a disk laser with an undoped YAG cap. Because of the device symmetry the FEM was developed for a quarter cylinder volume containing one TIR point (i.e. the model considered a quarter cylinder that was cut through the slab from air to the heat sink).

Several models were generated as we optimized the system. A typical model would contain 2,185 nodes and 1,848 elements. The model is severely reduced (i.e. deliberately small) to enable it to run fast and permit parametric studies of the relationships between the TIR spot (diameter, thickness and energy density) and the maximum system temperatures and stresses. In general, the more finely the FEM is meshed, the more accurate the results. However, the model run time increases a square of the number of nodes and the number of nodes increases as the cube of the number of elements on a side. Therefore, in practice one must trade run time versus the ability to make parametric studies. Several different size models were operated to ensure that reducing the number of nodes did not decrease model accuracy too much. In practice, we were able to keep the model small by taking advantage of the various planes of symmetry available and the fact that the effects of the thermal loading are relatively localized. The model was built up using individual material properties for the discrete layers shown in FIG. 1. Table 1 shows a typical set of material parameters for a sample calculation.

TABLE 1

Layer thickness and material properties used to develop a sample hybrid slab FEM. The Young's modulus for the $SiO_2$ and HR coating layers were estimated to be equivalent to fused silica.

| Material | Thickness (mm) | Thermal Conductivity (W/mm × ° C.) | Young's Modulus (N/mm²) |
|---|---|---|---|
| Copper | 1.0 | 0.391 | 117,200 |
| Indium | 0.0508 | 0.0818 | 10,600 |
| HR coating | 0.0041 | 0.001171 | 73,000 |
| $SiO_2$ | 0.0035 | 0.00070 | 73,000 |
| Yb:YAG | 0.10 to 0.70 | 0.0073 at −50° C. to 0.0057 at +51° C. | 280,000 |
| YAG | 4.5 | 0.0145 at −47° C. to 0.0095 at +49° C. | 280,000 |

Figure 2:
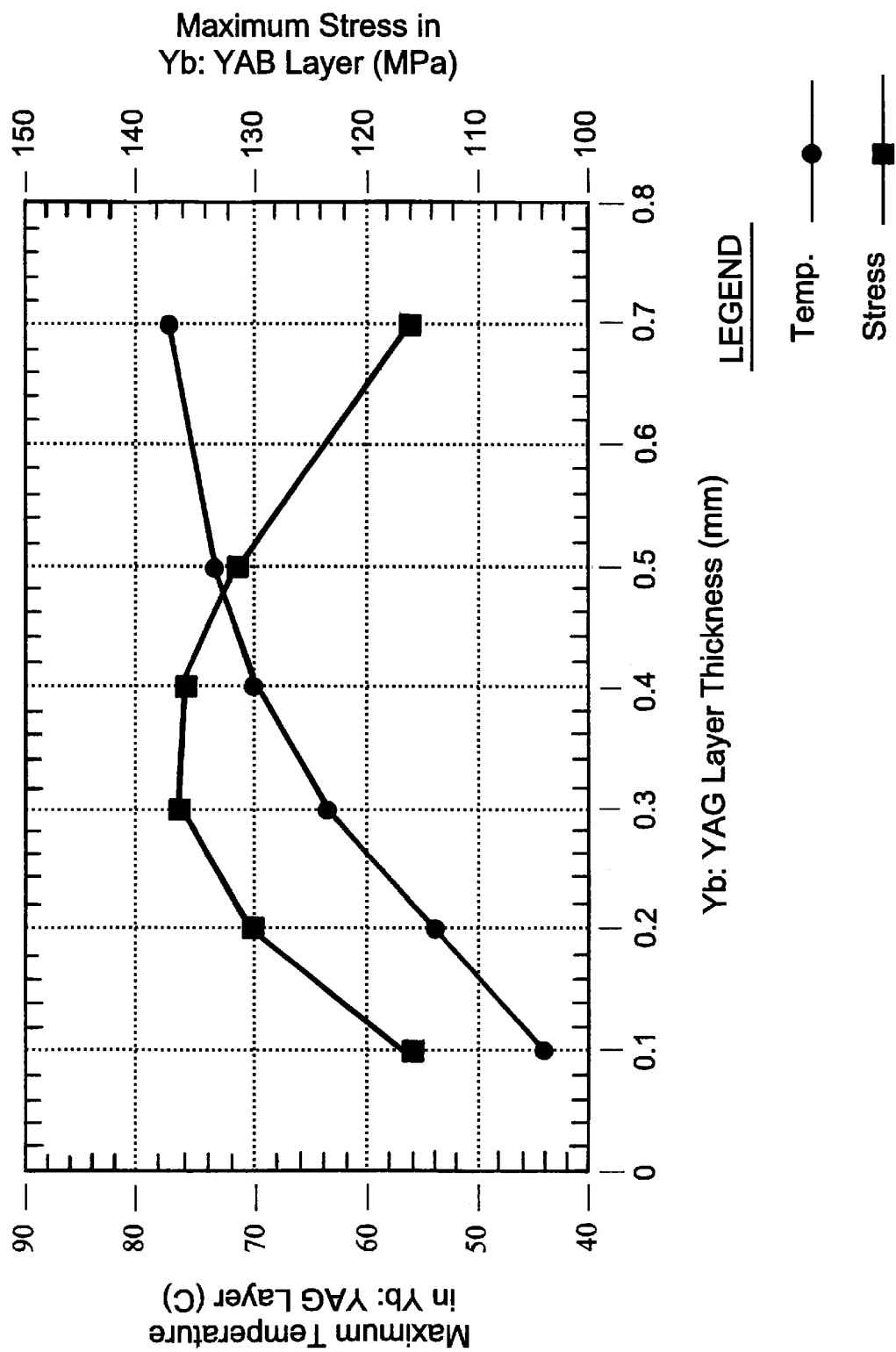
FIG. 2 is a graph that plots maximum temperature and stresses in the Yb:YAG layer of a hybrid slab gain medium as a function of Yb:YAG layer thickness. The set of cases assumes a 1.05 mm diameter pump beam and 5.3 W of heat deposited in each pump spot. The boundary conditions assume that the copper heatsink is held at −20° C. and the top of the slab is exposed to dry nitrogen at +25° C.

Stresses and temperatures were calculated in three dimensions for the composite slab for various deposited energy densities and layer thicknesses. Energy density refers to the net heat deposited in the material after pump absorption and Yb ion fluorescence. Three dimensional plots were then obtained for each case that showed thermal and stress gradients through the slab. By compiling the results of multiple runs we were able to observe how variations in energy density and layer thickness determined the maximum temperatures and stresses in the material. FIG. 2 shows how the maximum temperature and stress in the Yb:YAG layer varies with changing Yb:YAG layer thickness for a set of cases that assume a 1.05 mm diameter pump beam and a heat deposition of 5.3 W/TIR spot. The top of the slab is assumed to be surrounded by dry nitrogen gas at a temperature of 25° C. The far boundary of the copper heatsink is assumed to be held at a fixed temperature of 20° C.

For the FIG. 2 case shown, the maximum temperature increases as the Yb:YAG layer thickness increases since the entry face of the slab is farther from the heat sink. As shown, the temperature gradient across the slab can be as large as ~100° C. since the heat sink is held at −20° C. The maximum stress in the material reaches a peak for a Yb:YAG layer thickness of ~0.35 mm. As the Yb:YAG layer thickness increases the maximum stress decreases since the heat is spread out over a larger volume. In these cases the point of maximum stress physically corresponds to the spot of maximum temperature in the slab.

In FIG. 2, the graph plots maximum temperature and stresses in the Yb:YAG layer of a hybrid slab gain medium as a function of Yb:YAG layer thickness. The set of cases assumes a 1.05 mm diameter pump beam and 5.3 W of heat deposited in each pump spot. The boundary conditions assume that the copper heatsink is held at −20° C. and the top of the slab is exposed to dry nitrogen at +25° C.

The limiting thermal barrier for these cases is the $SiO_2$ and HR coating layers as these low conductivity coatings, despite being very thin, delay thermal transport. Table 1 shows the change in temperatures and stresses across the layers of the slab for the case of a 1.5 mm diameter pump beam, a Yb:YAG thickness of 0.2 mm and 4.0 W of heat per pumped spot. The values shown are divided by the thickness of the layers and are a measure of the change in temperature and stress per millimeter. The Yb:YAG layer is not shown because it is the loaded layer and has a peak temperature and stress in the middle of its layer.

TABLE 1

Changes in temperature and stresses across the layers of the hybrid slab. The case assumes a 1.5 mm diameter pump beam, a Yb:YAG thickness of 0.2 mm and 4.0 W of heat per pumped spot.

| Layer | Temperature change across layer (° C./mm) | Stress change across layer (MPa/mm) |
|---|---|---|
| Copper | 2.0 | 41 |
| Indium | 18.5 | 85 |
| HR coating | 1,317 | 2,293 |
| $SiO_2$ coating | 2,200 | 1,037 |
| Undoped YAG | 3.2 | 14 |

Table 1 clearly shows that the relatively low thermal conductivity of the $SiO_2$ and HR coatings have a very strong effect of the overall performance of the slab.

FIG. 3 shows a hybrid slab laser where the pump source 300 stimulates a carrier beam 301 to lasing in the active area 105 bound by a mirror 110 and hybrid slab 300 like the slab of FIG. 1.

Our design goal was to design multi-pass disk and slab gain media which would allow us to absorb almost all of the available pump power while keeping the gain media as thin as possible to minimize thermal effects.

As previously discussed, the hybrid slab geometry was conceived as a way to retain most of the disk laser advantages while potentially offering a higher damage threshold. This is one potential route to enabling high pulse energy laser operation. FIG. 3 shows a schematic of the hybrid slab pump geometry as originally developed. Multiple lasing spots are possible depending on the length of the slab. Unpumped regions between pumped spots are lossy areas that absorb 1.03 μm light. This supplies a natural defense against parasitic oscillations. The laser can be pumped through the top surface (shown) as with the disk laser or collinearly with the laser beam (i.e. through the Brewster faces). This permits excellent pump and laser pump overlap with little pump light "wasted" in nonlasing regions of the slab. In either case, fiber coupled diodes can be used to maximize pump brightness.

Alternatively, the entire Yb doped region could be illuminated through the top face or from the side. This would allow the use of bar diode arrays (substantially cheaper than fiber coupled diodes) for pumping the slab. A disadvantage of this approach is that the entire active region of the slab is pumped (as with side-pumped rods or traditional slabs) so that most of the pump energy is deposited in regions of the hybrid slab that do not contribute to $TEM_{00}$ laser output. Presumably, this would result in the generation of a non-$TEM_{00}$ rectangular output beam. A second disadvantage with this approach is that it is conducive to parasitic oscillations. Although, as with traditional slab lasers, this deleterious effect can be combated by frustrating reflections in directions other than those established by the TIR beam path.

FIG. 3 shows a side view of the hybrid slab laser gain medium. The laser is pumped through the top face as with the disk laser.

Slabs were fabricated out of undoped YAG and had overall dimensions of 14.5 mm long (top surface) by 8 mm wide and 4.75 mm high. This allowed one TIR spot in each slab. A slab containing only one TIR spot was sufficient to demonstrate the feasibility of the hybrid slab concept and much less expensive to fabricate than a longer slab. A 250 μm thick, 15 wt % Yb doped YAG wafer was diffusion bonded to each slab as shown in FIG. 3. Therefore, the hybrid slab had an overall height of 5 mm. The top or open face of the slab was antireflection coated at the pump wavelength and the bottom surface was coated as shown in FIG. 3. The ends of the slab were Brewster-cut, as shown in the figures. The slabs were mechanically pressed onto a heat sink using the same technique used to mount disks. An indium foil was placed between the heat sink and slab, prior to pressing, t act as a ductile "solder" and to improve thermal conductivity across the boundary. Inspection of the mounted slab using a HeNe laser light source and crossed polarizers (to check for birefringence) indicated very little stress birefringence and low overall transmission distortions ($<\lambda/2$).

A hybrid slab laser was demonstrated using a short, linear cavity design resonator. The slab was pumped through the top face as shown in FIG. 3. With 45 W of absorbed pump power we were able to produce 7.22 W of multi-mode (not $TEM_{00}$) laser output. Under these operating conditions the laser displayed a 27% absorbed power slope efficiency and operated 2.5 times above threshold. Thermal effects that distorted the pump and laser beam were quite noticeable at this pump power level. At higher pump powers further optical distortions prevented us from extracting more power. These distortions disrupted the spatial quality of both the pump and laser beams and caused the Yb:YAG laser beam to depolarize. It was hypothesized that even though the absolute thermal gradients in the slab were small, <12° C., that the relatively long optical path lengths in the slab (relative to a disk laser) resulted in large cumulative wavefront phase distortions.

The slab laser was operated using physically short resonators. We were not able to construct longer resonators because of the strong thermal lens that was created in the slab and our limited selection of cavity optics. Therefore, we were not able to build resonators long enough to enable insertion of the acousto-optic Q-switch and we did not demonstrate pulsed operation.

Significant variations in lasing performance were found depending on what part of the slab was lased. This indicates that thermal contact between the heat sink and the slab (or disk) may not have been uniform across the laser gain medium. Additionally, by modulating the pump beam and using a cw HeNe laser beam as a probe we observed that it took approximately 5 msec for localized heating in the slab to severely distort the probe beam. We also observed that this distortion lased for approximately 500 msec after the pump beam was turned off. These time durations are characteristic of processes involving thermal diffusion.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A hybrid slab laser system for use with a pump laser that emits a laser pumping beam that provides pump energy to the hybrid slab laser, said hybrid slab laser system comprising:

an active laser substrate which has a top and a bottom side and which contains material layers which are stimulated the laser pumping beam to emit a laser output beam, a mirror fixed to the bottom side of the active layer substrate;

an undoped YAG layer that is face bonded to the top side of the active layer substrate and through which laser signals from the active layer substrate passes;

a Yb doped YAG layer that is fixed above the undoped YAG layer and which amplifies laser signals from the active layer back into the amplifying mode volume of the active layer substrate with no losses, an metallic reflecting coating which is fixed above the Yb doped YAG layer to reflect laser signals back through the Yb doped YAG layer into the active layer substrate; and a heat sink which is fixed above the metallic reflecting coating to reduce thermal effects of the laser signals.

* * * * *